July 13, 1954   H. L. ADAMS   2,683,678
GLASS MOUNTING
Filed Oct. 26, 1951

INVENTOR.
HAROLD L. ADAMS
BY
AGENT

Patented July 13, 1954

2,683,678

UNITED STATES PATENT OFFICE 2,683,678

GLASS MOUNTING

Harold L. Adams, Seattle, Wash., assignor to Boeing Airplane Company, Seattle, Wash., a corporation of Delaware Application October 26, 1951, Serial No. 253,338

3 Claims. (Cl. 154—2.71)

1

This invention relates to the installation of glass. Although of general application it is especially suitable for the tensional mounting of airplane windows and canopies.

The mounting means comprises laminated fiber glass cloth cemented to the edges of glass which have been prepared by employing a fusion process to cover the edge surfaces with finely powdered metal.

A successful bonded tensional mounting has been developed for plastic aircraft windows and canopies. However, attempts to use glass rather than plastic have failed largely because of the difficulty encountered in making a reliable bonded joint between any material and glass which will retain its strength in the presence of humidity and where there is the likelihood of stress concentrations.

It is therefore the purpose of this invention to prepare the glass edges to receive an edge material which can be successfully bonded to the glass and also serve as a damping medium avoiding the transmittal of stress concentrations to the glass. By accomplishing this purpose the advantages of a glass installation are realized, such as: greater pressure load per unit of weight, clearer vision, and no crazing.

The objects of this invention are to provide: a tensional glass mounting which is dependable in the presence of humidity; a glass mounting of uniform expansion characteristics; a low cost tensional mounting for glass; an all weather glass mounting; and a flexible edge mounting for glass.

The purpose of the invention and these objects will become more apparent as the following description of the mounting embodying the invention is read with reference to the accompanying drawing in which.

Figure 1:
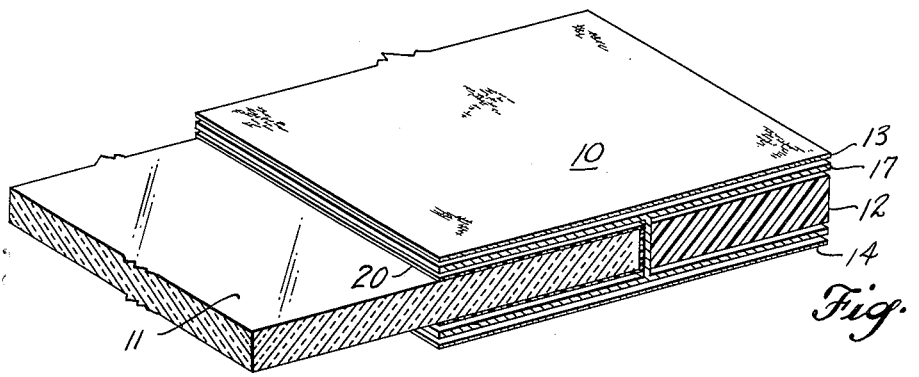
Figure 1 is a perspective view, partially sectioned showing the assembled edge construction.
Figure 2:
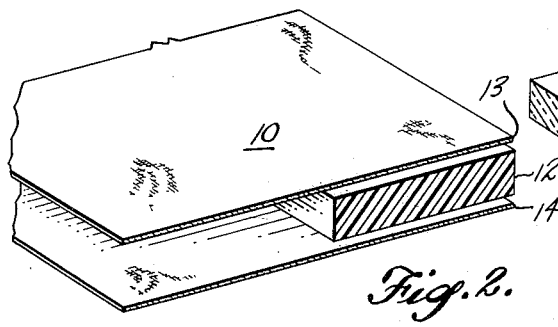
Figure 2 is a perspective view partially sectioned showing the arrangement of the portions of the edge material.
Figure 3:
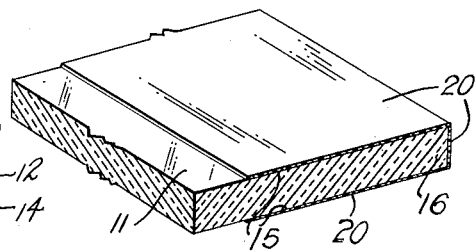
Figure 3 is a perspective view, partially sectioned, illustrating the prepared edge portions of the glass.

Referring now to the drawing wherein like numerals refer to like and corresponding parts throughout the several views, Figure 1 illustrates the final assembly of the edge construction comprising a laminated edge material 10 of fiber glass cloth fabricated in three separate portions

2

12, 13, and 14, a glass 11 with fused metal edges capable of abutting the portion 12, and fitting between the two portions 13, 14 of the laminated edge material 10, the entire assembly being cemented together.

More particularly, the edge material 10, is arranged for convenience into three portions, permitting size adjustments in the abutting or filler portion 12 to comply with various thicknesses of glass, and size adjustments in the clamping portions 13 and 14 to satisfy the strength requirements. All portions 12, 13 and 14 are fabricated by placing fiber glass cloth in a viscous resin such as methyl methacrylate monomer, partially polymerized, adding layers of glass cloth until the desired thickness is obtained. Excess resin and entrapped air is then removed by using weights to obtain five pounds pressure per square inch in the laminated edge material 10.

Ultraviolet light is then employed to obtain a laminated composition highly desirable for carrying out the purpose of the invention.

The glass 11 has its margins 15 and edge 16 prepared by uniting with them powdered metal 20 or combination of powdered metals by employing a well recognized fusion process. Such a process generally consists of heating the glass below its annealing temperature and spraying molten metal on the margins and edges of the glass.

This treatment of the glass is vital to the successful practice of this invention. When omitted and there is humidity present during use, the edge material invariably fails to retain its bond with the glass edges, regardless of the type of cement that may be used.

After the glass edges have been fused with powdered metal in this manner, the interfitting surfaces of the metalized glass and the edge material 10 are all coated with cement 17 of a standard type suitable for the proper adhesion within the temperature range involved, such as the light activated Lucite adhesive covered by United States Patents 2,367,661 and 2,367,670.

The components are subsequently interfitted and held in place until the cement 17 sets.

A glass window or canopy with its edges constructed in this novel manner can be successfully installed to withstand weathering and all stresses encountered in airplane operation or under similar demanding conditions. The presence of the fused metal assures the reliability of the cemented bond to the fiber glass cloth in the presence of humidity. The use of fiber glass cloth assures the absence of detrimental thermal stress concentrations because its coefficient of thermal expansion so closely approximates that of glass alone. In addition the laminated structure of the fiber glass material provides the elasticity needed to uniformly redistribute stresses to the glass as they occur at localized points of structural attachment. The elasticity also prevents the transmission of bending moments to the glass which are generated in the fuselage framing.

Figure 4:
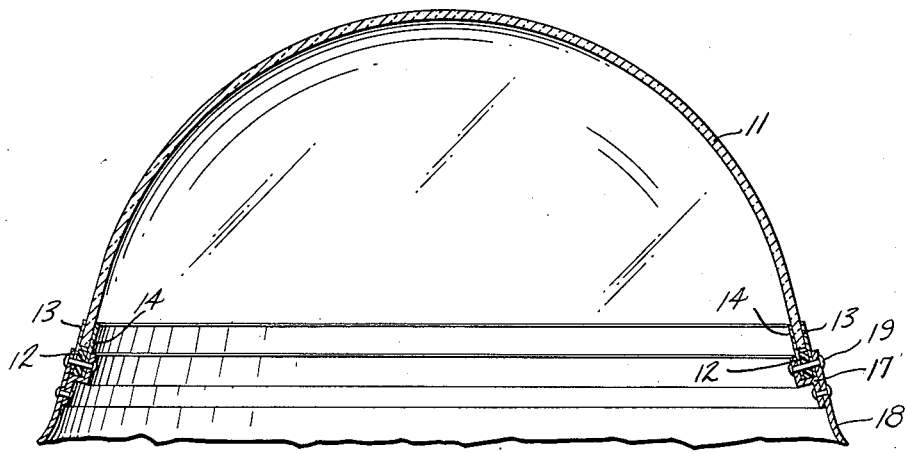
Figure 4 is a sectional view of an airplane canopy installation.

Figure 4 illustrates the utilization of the invention in fitting a glass dome or canopy to a channel 17 surrounding an opening in a fuselage 18. A suitable fastener 19 passing through the channel flanges and portions 12, 13 and 14 of the edge material 16 securely holds the dome in place. The line of attachment, determined by the circumferential row of fasteners, is sufficiently below the termination of the glass so only the laminated fiber glass cloth is confined within the channel 17. This relationship of the cooperating parts prevents direct contact of the fuselage frame members with the glass dome, and conversely permits the laminated fiber glass cloth to serve as a force-damping medium.

With this structural arrangement the glass is retained in position free of harmful concentrated stresses and with the novel bond between the glass and fiber glass cloth the permanency of the installation is assured.

The general proportions and the relationships of the various parts as described herein and indicated in the drawing are desirable to the proper utilization of the novel edge construction but changes in size, shape, and detail could be made within the scope of the appended claims.

I claim:

1. A glass tensional mounting suitable for airplane construction comprising a glass substantially covering an opening in a structure; metallic coatings firmly secured to the marginal portions of the glass; cement coatings over the metallic coatings; and an edge material substantially composed of fiber glass and resin attached to the coated marginal portions of the glass extending beyond the glass edges and attached to structure.

2. A glass mounting suitable for airplane construction comprising a laminated element composed of fiber glass cloth layers bonded together with resin and arranged in three major portions, a glass window substantially covering an opening in a structure, metallic coatings secured to the marginal and edge portions of the glass, and adhesive coatings over the metallic coatings bonding the three major portions of the laminated element to the metallic coatings; the three major portions of the laminated element being arranged so that one portion of the laminated element abuts the metallic coated glass edge and the other two portions of the laminated element overlie respectively the opposite sides of both the metallic coated marginal portion of the glass and the one portion of the laminated element that abuts the metallic coated edge; and the outer edges of the laminated element being formed for insertion in a structural portion of an airplane.

3. A glass mounting suitable for window installations where adverse temperatures, pressures and vibrations are encountered, comprising a glass substantially covernig an opening in a structure; metallic particles firmly adhered to the marginal portions of the glass; adhesive on the metalized marginal portions of the glass; and an edge material, flexible, strong and of glass-like expansive characteristics firmly attached to the adhesive metalized marginal portions of the glass and extended beyond the glass edges into a window frame and fastened thereto.

References Cited in the file of this patent

UNITED STATES PATENTS

| Number | Name | Date |
|---|---|---|
| 1,885,232 | Colbert | Nov. 1, 1932 |
| 2,097,073 | Long | Oct. 26, 1937 |
| 2,235,680 | Haven | Mar. 18, 1941 |
| 2,258,724 | Wagner | Oct. 14, 1941 |
| 2,511,168 | Martin | June 13, 1950 |